United States Patent
Trainer et al.

(10) Patent No.: US 12,492,694 B2
(45) Date of Patent: Dec. 9, 2025

(54) PERSONAL AIR SAMPLING PUMP ASSEMBLY

(71) Applicant: IDEAL Industries, Inc., Sycamore, IL (US)

(72) Inventors: Brandon Trainer, Bedford (GB); Steve Tearle, Bedford (GB); Aamir Qureshi, Bedford (GB)

(73) Assignee: Casella Holdings Limited (GB)

( * ) Notice: Subject to any disclaimer, the term of this patent is extended or adjusted under 35 U.S.C. 154(b) by 0 days.

(21) Appl. No.: 17/901,455

(22) Filed: Sep. 1, 2022

(65) Prior Publication Data

US 2022/0412338 A1    Dec. 29, 2022

Related U.S. Application Data

(63) Continuation of application No. 17/009,520, filed on Sep. 1, 2020, now Pat. No. 11,434,894, which is a
(Continued)

(51) Int. Cl.
*F04B 39/12* (2006.01)
*F04B 39/00* (2006.01)
(Continued)

(52) U.S. Cl.
CPC ........ *F04B 45/047* (2013.01); *F04B 39/0027* (2013.01); *F04B 39/005* (2013.01);
(Continued)

(58) Field of Classification Search
None
See application file for complete search history.

(56) References Cited

U.S. PATENT DOCUMENTS 2,342,906 A * 2/1944 Smith .................. F16J 15/52
                                                    92/48
2,405,466 A    8/1946 Tabb
(Continued)

FOREIGN PATENT DOCUMENTS

CN    2262114 Y    9/1997
GB    440693 A    1/1936
(Continued)

OTHER PUBLICATIONS

Machine Translation of JP2018030350 Kaneko (Obtained from USPTO Search) (Year: 2025).*
(Continued)

*Primary Examiner* — Dominick L Plakkoottam
*Assistant Examiner* — Geoffrey S Lee
(74) *Attorney, Agent, or Firm* — Greenberg Traurig, LLP

(57) ABSTRACT

An air sampling pump includes a reciprocating piston for operating a diaphragm assembly. The diaphragm includes a valve head including a fluid inlet and a fluid outlet and a fluid chamber defining a fluid path between the inlet and outlet. A diaphragm sealing engages the valve head and encloses the fluid chamber. The diaphragm includes a piston diaphragm membrane portion coupled to the piston for reciprocating with the piston and reciprocation of the piston causes a change in air pressure within the fluid chamber to cause air to move from the fluid inlet toward the fluid outlet. The diaphragm includes a damper membrane portion, which cooperate to reduce an amplitude of pulsation in the airflow at the fluid inlet and fluid outlet.

23 Claims, 15 Drawing Sheets

Related U.S. Application Data continuation of application No. 15/136,377, filed on Apr. 22, 2016, now Pat. No. 10,774,825.

(60) Provisional application No. 62/153,167, filed on Apr. 27, 2015.

(51) Int. Cl.
*F04B 45/047* (2006.01)
*F04B 53/10* (2006.01)

(52) U.S. Cl.
CPC ...... *F04B 39/0055* (2013.01); *F04B 39/0072* (2013.01); *F04B 39/121* (2013.01); *F04B 39/123* (2013.01); *F04B 39/125* (2013.01); *F04B 53/109* (2013.01)

(56) References Cited

U.S. PATENT DOCUMENTS

| | | | |
|---|---|---|---|
| 3,282,224 A | 11/1966 | Bock et al. | |
| 3,366,067 A * | 1/1968 | Kocolowski | F04B 43/04 417/540 |
| 3,814,552 A | 6/1974 | Guggenheim et al. | |
| 4,063,824 A | 12/1977 | Baker et al. | |
| 4,091,674 A | 5/1978 | Amey | |
| 4,432,248 A * | 2/1984 | Lalin | G01N 1/2273 73/864.34 |
| 4,532,814 A * | 8/1985 | Lalin | G05D 7/03 73/864.34 |
| 4,565,501 A | 1/1986 | Laurendeau et al. | |
| 4,594,059 A * | 6/1986 | Becker | F04B 11/0033 417/540 |
| 4,896,548 A * | 1/1990 | Lalin | F04B 11/0033 73/864.34 |
| 5,107,713 A | 4/1992 | Peck et al. | |
| 5,205,326 A | 4/1993 | Paley et al. | |
| 5,380,164 A * | 1/1995 | Fry | F04B 19/06 347/85 |
| 5,732,741 A | 3/1998 | Shiery | |
| 6,135,093 A * | 10/2000 | Kikuchi | F02M 55/04 123/467 |
| 6,257,847 B1 | 7/2001 | Silver et al. | |
| 6,478,052 B1 | 11/2002 | Conley et al. | |
| 6,808,517 B2 | 10/2004 | Greter et al. | |
| 7,008,400 B2 | 3/2006 | Silver et al. | |
| 8,366,421 B2 | 2/2013 | Munakata et al. | |
| 8,512,010 B2 | 8/2013 | Stutz et al. | |
| 9,243,710 B2 | 1/2016 | Henriques, Jr. et al. | |
| 9,644,622 B2 | 5/2017 | Stutz et al. | |
| 9,829,140 B2 * | 11/2017 | Hartmann | F16L 55/041 |
| 2003/0031572 A1 * | 2/2003 | Tearle | F04B 45/047 417/534 |
| 2007/0292276 A1 | 12/2007 | Stutz et al. | |
| 2009/0246035 A1 | 10/2009 | Patzer | |
| 2010/0045096 A1 | 2/2010 | Schonlau et al. | |
| 2012/0006303 A1 | 1/2012 | Usui et al. | |
| 2012/0063925 A1 | 3/2012 | Parker | |
| 2012/0070323 A1 * | 3/2012 | Felber | A61M 1/80 417/413.1 |
| 2012/0289934 A1 | 11/2012 | Greter et al. | |
| 2015/0267854 A1 * | 9/2015 | Selwyn | F16L 55/053 138/30 |
| 2022/0136495 A1 * | 5/2022 | Ikedo | F04B 45/043 417/395 |

FOREIGN PATENT DOCUMENTS

| | | | | |
|---|---|---|---|---|
| JP | 2018030350 A | * | 3/2018 | B41J 2/175 |
| KR | 100677924 B1 | | 5/2006 | |
| WO | 2012/006464 A2 | | 1/2012 | |

OTHER PUBLICATIONS

ISA/US, International Search Report and Written Opinion issued on PCT application No. US16/28928, dated Aug. 8, 2016, 8 pages.

European Patent Office, supplementary European search report issued on EP patent application No. 16786954.4, dated Apr. 10, 2018, 7 pages.

Indian Patent Office, Examination Report issued on Indian patent application No. 201717036262, dated Jun. 26, 2020, 6 pages.

KIPO, Office Action issued on Korean patent application No. 10-2017-7032109, received Nov. 22, 2021, 3 pages.

KIPO, Translation of Office Action issued on Korean patent application No. 10-2017-7032109, received Nov. 22, 2021, 3 pages.

* cited by examiner

PERSONAL AIR SAMPLING PUMP ASSEMBLY

CROSS REFERENCE TO RELATED APPLICATIONS

This application is a continuation of U.S. patent application Ser. No. 17/009,520, filed Sep. 1, 2020, now U.S. Pat. No. 11,434,894, which in turn is a continuation of U.S. patent application Ser. No. 15/136,377, filed Apr. 22, 2016, now U.S. Pat. No. 10,774,825, which in turn is a non-provisional application claiming priority from U.S. Provisional Application Ser. No. 62/153,167, filed Apr. 27, 2015, each of which are incorporated herein by reference in their entirety.

FIELD OF THE DISCLOSURE

The present description relates generally to a diaphragm air pump and more particularly to a personal air sampling pump assembly.

BACKGROUND OF RELATED ART

Personal air sampling pumps and controls are generally known. For instance, U.S. Pat. No. 3,814,552 describes a personal air sampling pump including a solenoid driven rubber diaphragm and rubber flapper check valves to control inlet and outlet flow. The diaphragm has a flexible annulus and a rigid central section and is used with independently timed drive pulses for essentially constant flow with varying load.

Similarly, U.S. Pat. No. 4,063,824 describes a constant flow air sampling pump including a variable drive pump that is connected to a filter and that is driven by an electric motor and is controlled by a feedback circuit of an integrator and an amplifier to maintain a constant flow of air through a dosimeter. The dosimeter is worn by an individual and at the termination of a period of time, such as a work day, the filter is removed and the collected contents are analyzed by conventional techniques such as gas chromatography to determine a level of exposure of the individual using the dosimeter.

Still further, U.S. Pat. No. 4,091,674 describes an electronically timed, positive displacement air sampling pump for use with air sample collecting devices in various environmental conditions. The device provides for average flow rate, independently metered total volume, operating time register and an audible "rate fault" alarm.

U.S. Pat. No. 5,107,713, describes a microprocessor controlled air sampling pump that utilizes a PWM controlled DC electric motor for regulating air flow generated by a diaphragm-type air pump. The control system regulates air flow as a function of the RPM of the motor by establishing a table of values which relate motor RPM to air flow rates. The control system maintains RPM at the desired value but includes a control loop which senses deviations in RPM and adjusts the PWM signals to the motor to regulate RPM.

While the identified devices may generally work for their noted purposes, there is an identifiable need for an improved personal air sampler as disclosed herein.

DETAILED DESCRIPTION

The following description of example methods and apparatus is not intended to limit the scope of the description to the precise form or forms detailed herein. Instead the following description is intended to be illustrative so that others may follow its teachings.

The present disclosure is generally directed toward a rotary diaphragm air pump that integrates the function of piston head diaphragms, airflow flow pulsation dampers and sealing gaskets within a single compact housing assembly. In general, the layered design arrangement disclosed may reduce manufacturing cost, the number of component parts used to effect operation, and/or the overall product size. The present design may reduce assembly time and may create a 'fail-safe' assembly procedure that typically does not require the use of adhesives or sealants. As a result of the integrated design, a relatively optimal flow performance can be achieved with minimal flow pulsations.

Figure 13:
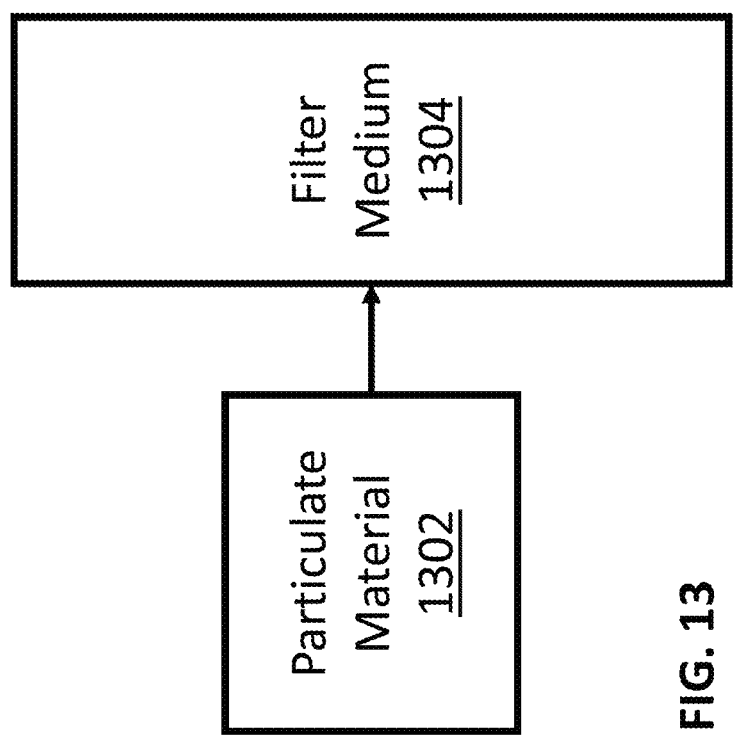
FIG. 13 is a diagram illustrating particulate material being collected onto a filter medium.

In the personal air sampling pump application where particulate material 1302 may be collected onto a filter medium 1304 as shown in FIG. 13, low pulsation of the inlet airflow is oftentimes desired to prevent vibration of the collection filter and subsequent loss of the deposited material. A smooth airflow is also highly desired to ensure the correct performance of size-selective inlet devices such as cyclones. Furthermore, in at least some examples, the pulsation performance of the presently disclosed personal air sampling pump complies with the requirements of international Air Sampling Pump Standards such as ISO13137.

Referring now to FIGS. 1-10, an example of a personal air sampling pump assembly 10 is illustrated. It will be understood that in the present disclose, the terms fluid, air, gas, etc. may be equivalently utilized, and the operating principles of the present disclosure should not be limited to any specific gas, fluid, or mixture unless specifically stated otherwise. The example pump assembly 10 generally defines a housing comprising a motor housing 11, a first valve head and pulsation damper assembly 12 and a second valve head and pulsation damper assembly 14. In this example, the pump assembly 10 further includes an outlet assembly 16 fluidly coupled to the first valve head and pulsation damper assembly 12 via an outlet 17. The outlet assembly 16 may include a device or other suitable structure that for the purpose of outlet flow rate sensing. It will be understood that the outlet assembly may include and/or may be coupled to any suitable device to provide "further processing" on the outlet fluid including, for example, monitoring for toxins, radiation, etc. In operation, a motor 18 is used to drive an oscillatory linear motion of an articulated pump piston assembly 20 mounted within the motor housing 11. In this example, the articulated pump piston assembly 20 includes a dual piston setup 20a, 20b, with each of the pistons 20a, 20b coupled to drive an associated piston diaphragm. In particular, in this example, the oscillating motion of the piston and the piston diaphragm is used to pump air through a valve the valve head and pulsation damper assemblies 12, 14 as best viewed in FIGS. 4, 7A, 7B.

In one example, operation of the motor 18 may be controlled by a closed loop flow control system as disclosed in copending U.S. application Ser. No. 14/688,370, entitled "Air Sampler With Closed Loop Flow Control System," filed Apr. 16, 2015, and incorporated herein by reference in its entirety.

Figure 1:
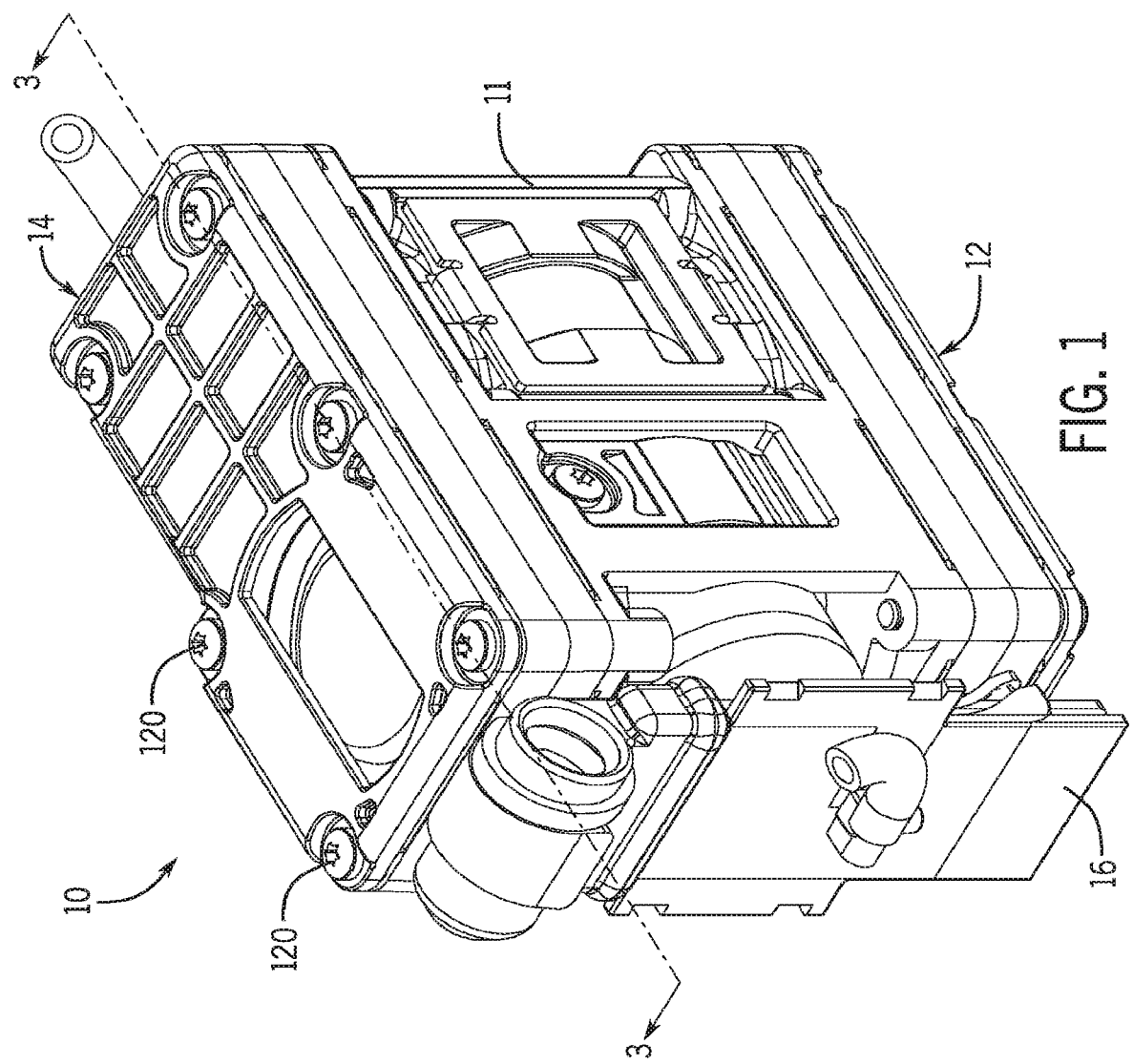
FIG. 1 is a front perspective view of one example of a personal air sampling pump assembly in accordance with the present disclosure.
Figure 2:
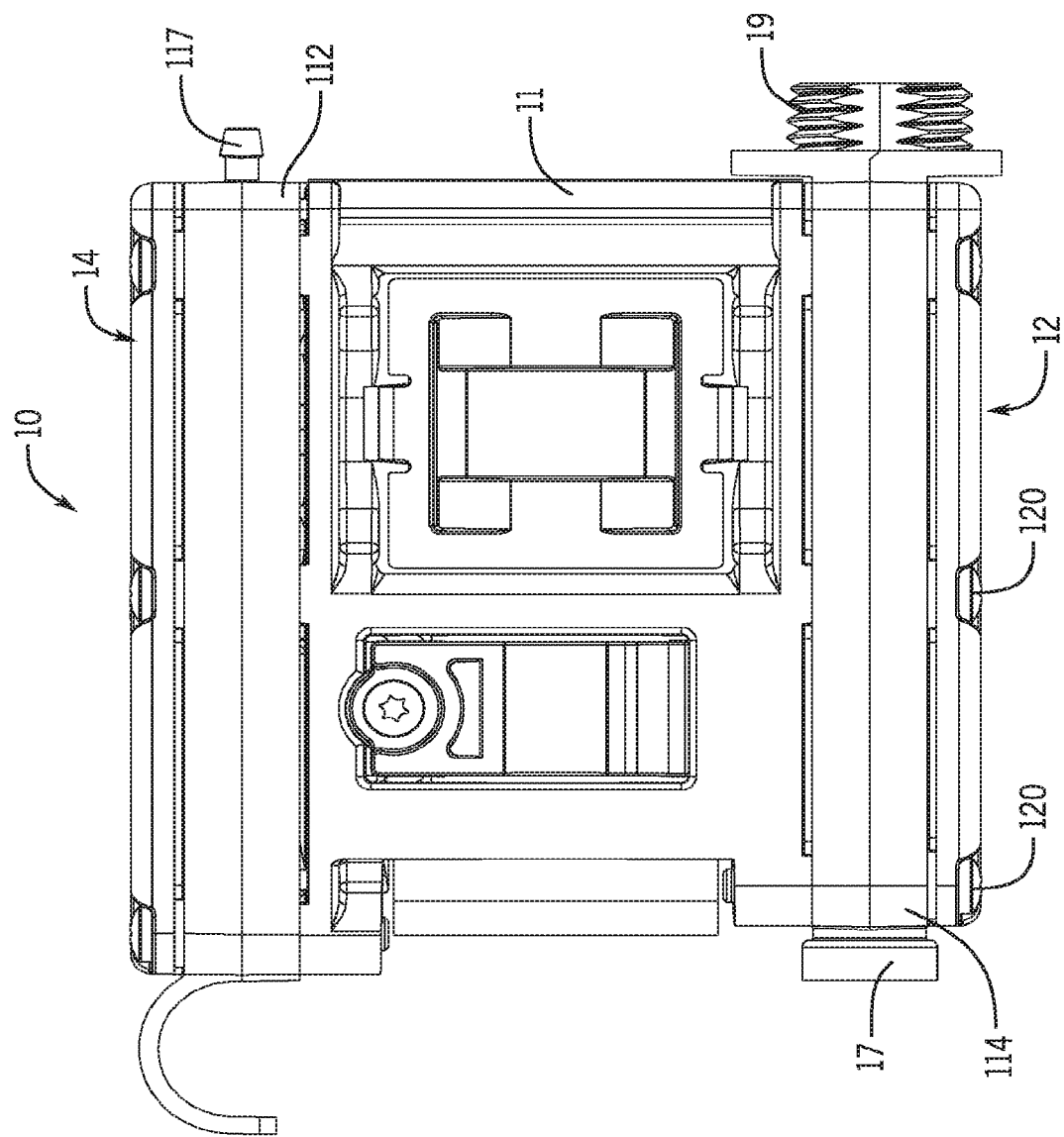
FIG. 2 is a side elevational view of the example personal air sampling pump assembly of FIG. 1.
Figure 3:
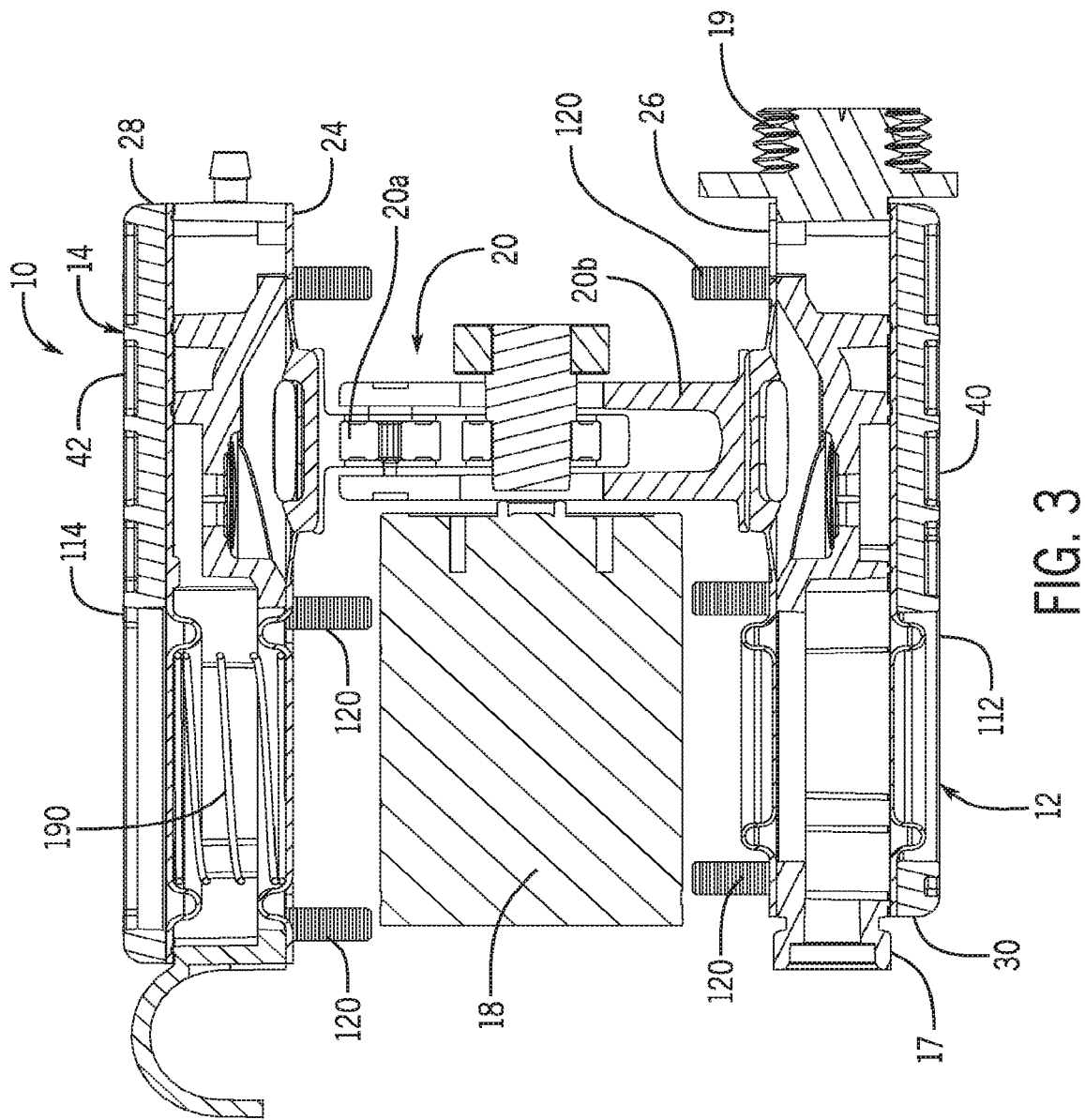
FIG. 3 is a cross sectional view of the example personal air sampling pump assembly of FIG. 1 taken along line 3-3.
Figure 7A:
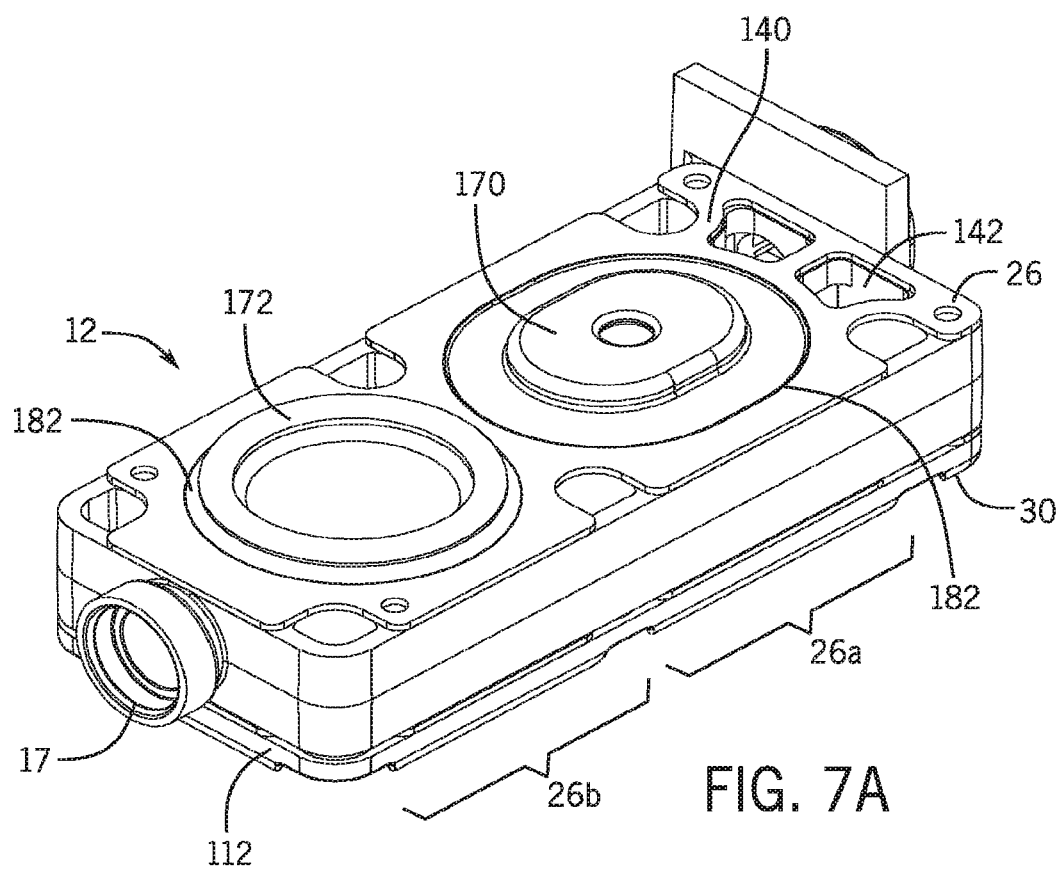
FIG. 7A is a perspective view of a valve chest with an inlet pulsation damper for use with the example personal air sampling pump assembly of FIG. 1.
Figure 7B:
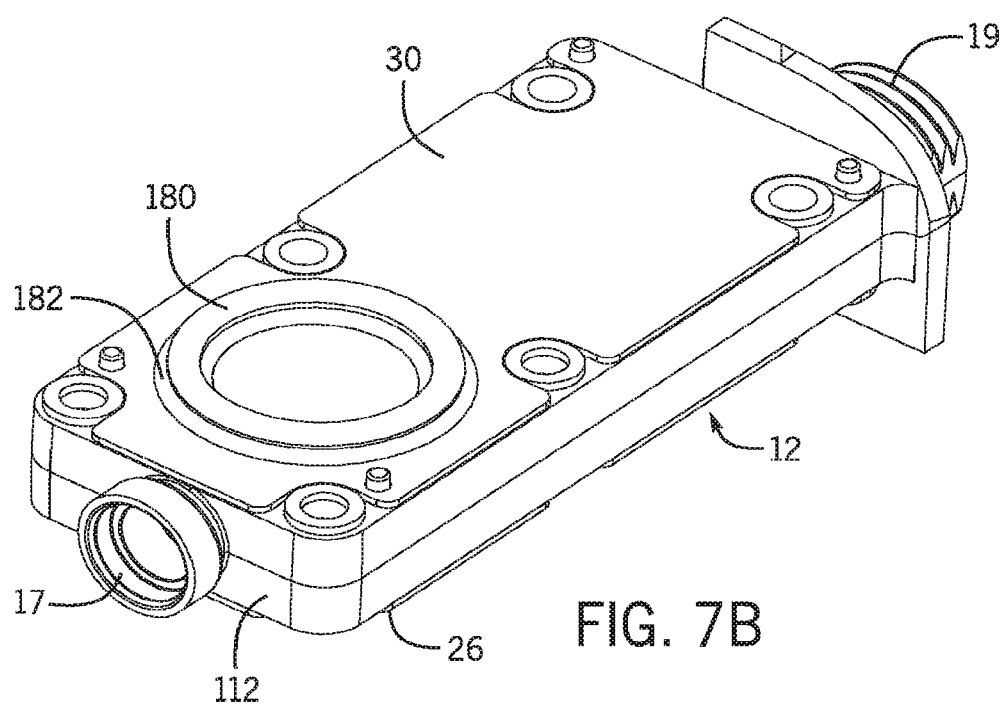
FIG. 7B is a reverse perspective the valve chest with an inlet pulsation damper of FIG. 7A.
Figure 8A:
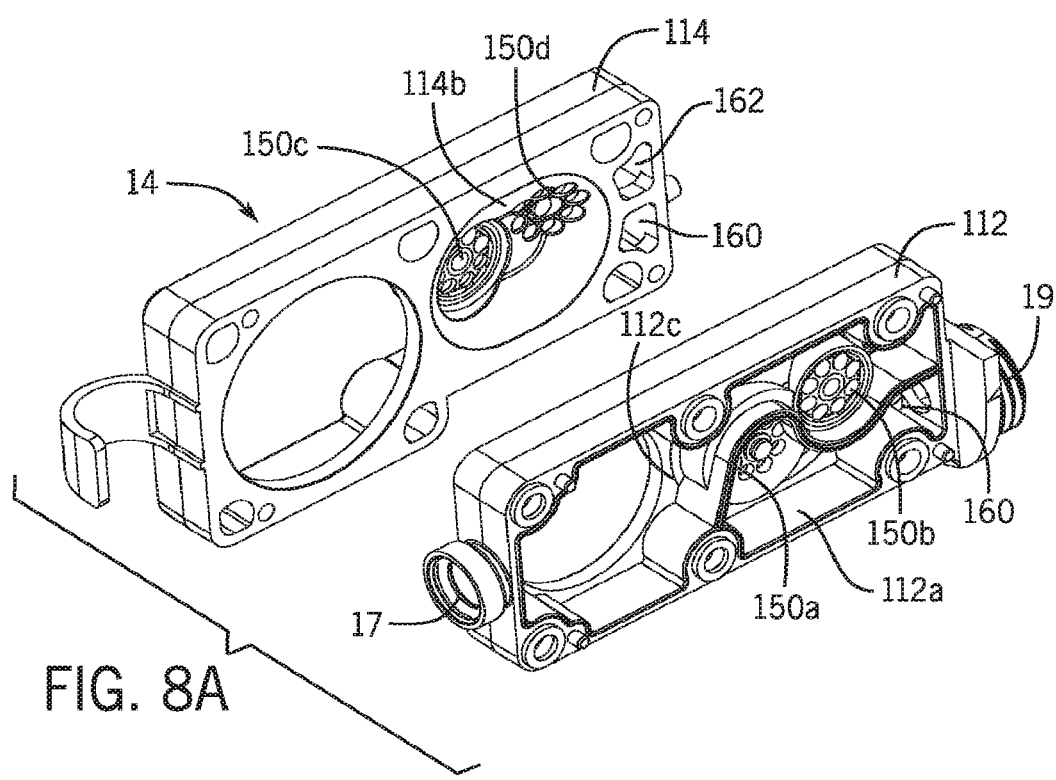
FIG. 8A is a perspective view of a two example valve head and pulsation damper assemblies for use with the example personal air sampling pump assembly of FIG. 1.
Figure 8B:
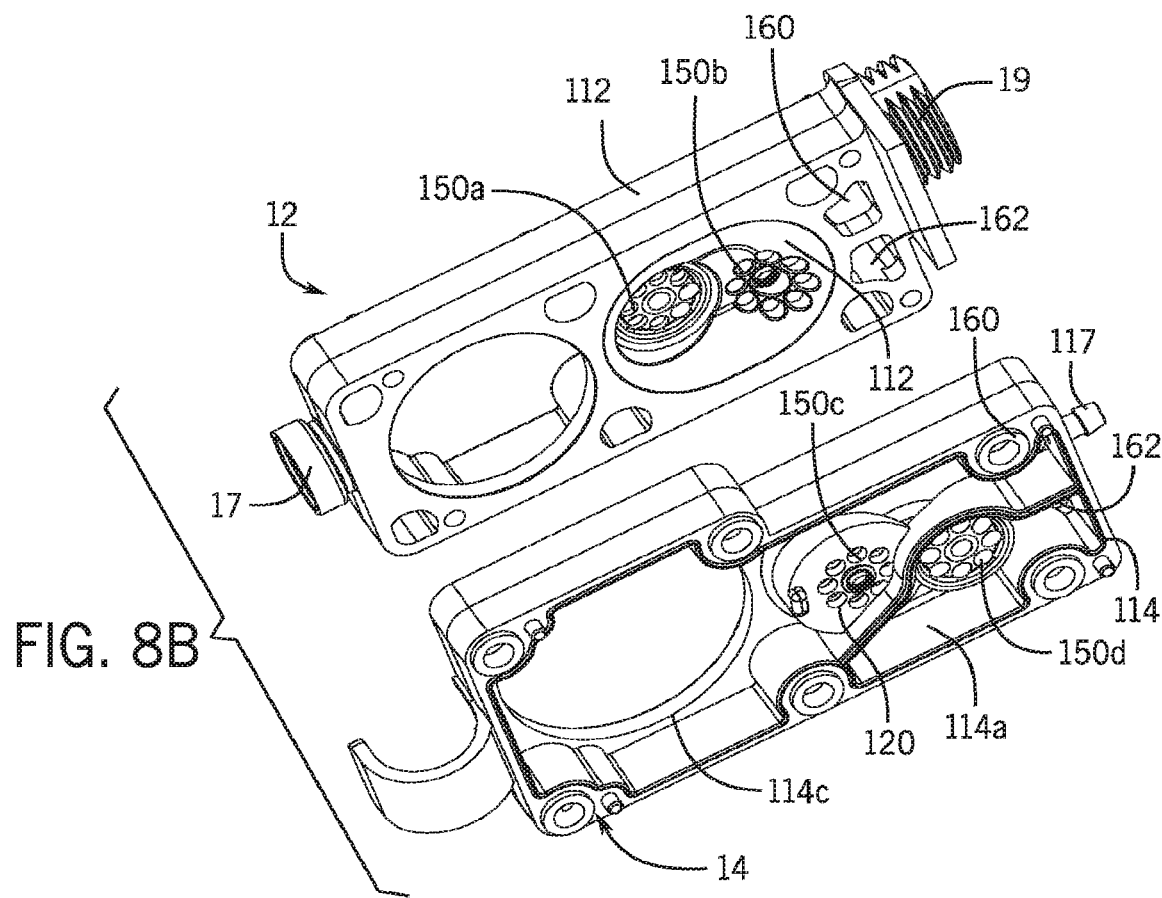
FIG. 8B is a reverse perspective view of the two valve head and pulsation damper assemblies of FIG. 8A.
Figure 9:
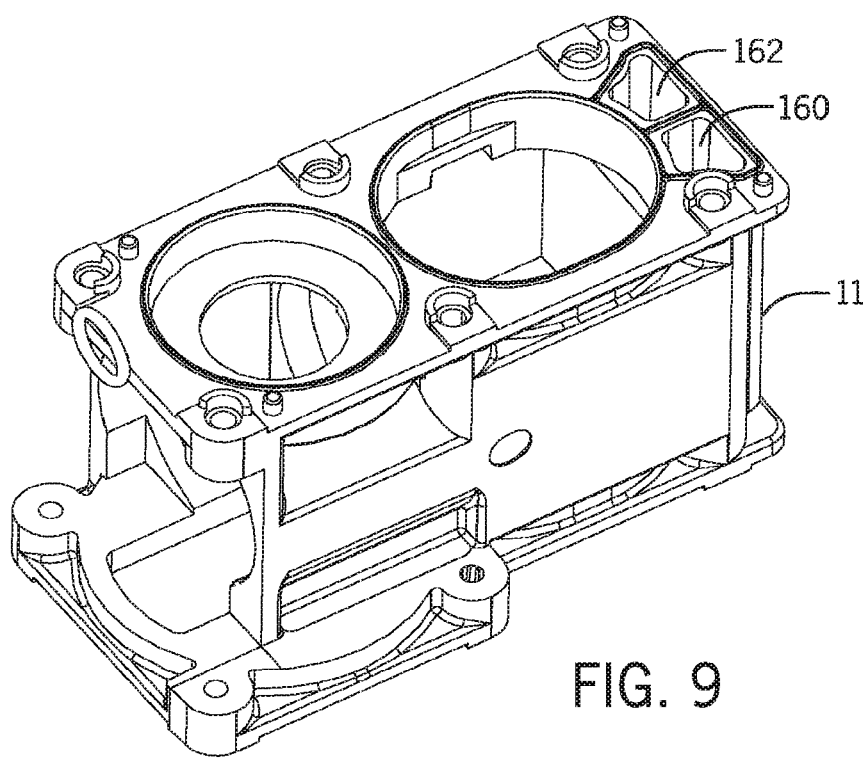
FIG. 9 is a perspective view of an example motor housing for use with the example personal air sampling pump assembly of FIG. 1.
Figure 10:
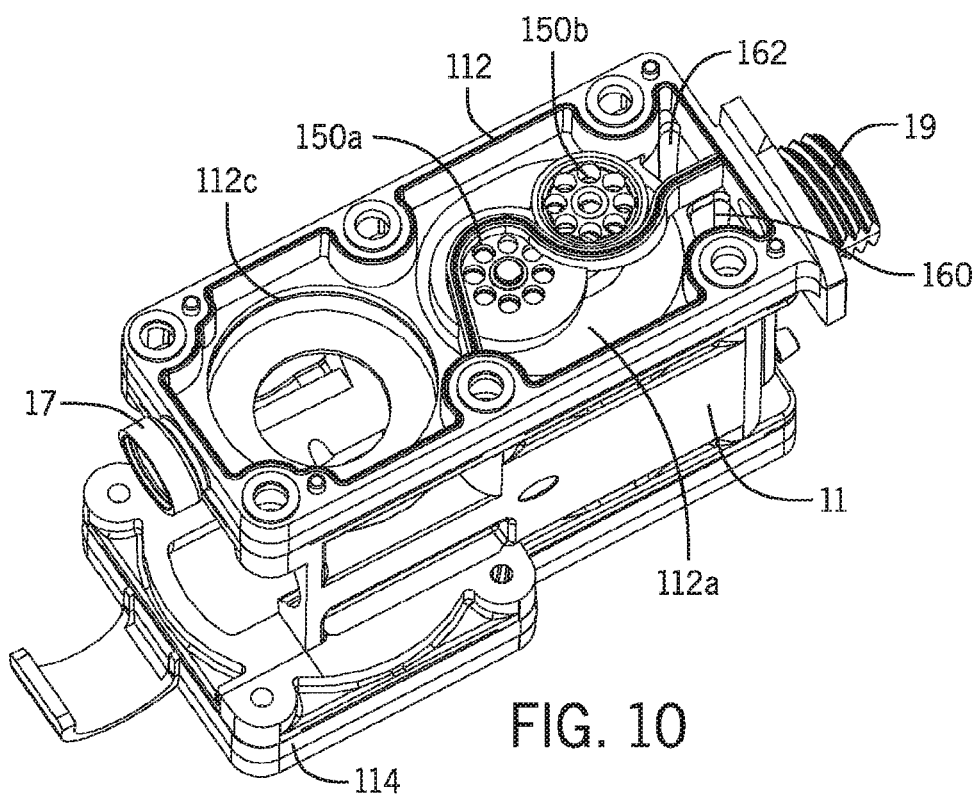
FIG. 10 is a perspective view of the motor housing of FIG. 9 coupled to the valve head and pulsation damper assemblies of FIGS. 8A and 8B.

Referring to FIG. 3, in this example, the valve head and pulsation damper assembly 14 forms a second air chamber, while the valve head and pulsation damper assembly 12 forms a first air chamber. Together, the pistons 20a, 20b, and the assemblies 12, 14, respectively form a piston diaphragm assembly. Each of the valve head and pulsation damper assemblies 14, 12 generally includes a housing or head, including for instance, a first valve head 112 and a second valve head 112. Each of the first head 112 and second head 114 includes a first elastomeric element 24, 26 that is coupled to one of the pistons 20a, 20b, and that seals one side of the associated head 112, 114. A second set of elastomeric elements 30, 32 are located on an opposite side of each of the valve heads 112, 114 to seal the second side of the valve head. Each of the valve heads 112, 114, may additionally be sealed via a cover plate 40, 42 securely fastened to the associated head 112, 114 via any suitable method, including via a plurality of fasteners, such as threaded fasteners 120. It will be appreciated that FIGS. 7A and 7B illustrate one example of the valve head and pulsation damper 12. The example assembly 12 includes the valve head 112, with elastomeric elements 26, 30 sealing coupled to either side of the valve head 112. The valve head 112 includes an inlet 19 in addition to the outlet 17. As will be described in detail herein, the valve head 112 and the elastomeric element 26 includes a plurality of apertures 140, 142 to allow fluid communication between the valve heads 112, 114 through a first conduit 160 and a second conduit 162 formed in the motor housing 11.

Referring to FIGS. 8A, 8B, and FIGS. 3 and 4, each of the valve heads 114, 112, defines various air chambers 112a, 112b, 112c, and 114a, 114b, 114c, respectively. In the illustrated example, the various air chambers 112a, 112b, 112c, and 114a, 114b, 114c are fluidly coupled via a plurality of apertures 150. Each of the apertures 150 may include a check valve 152, which are each hidden in FIGS. 8A, 8B, but are visible in FIGS. 3 and 4. As is known in the art, the check valves 152 may be utilized to provide for a single airflow direction and to prevent air from flowing in a non-desired direction.

Accordingly, in this example construction, the inlet 19 is fluidly coupled to the air chamber 112a and also to the conduit 160. The air chamber 112a is fluidly coupled to the air chamber 112b through a first set of apertures 150a and one of the check valves 152. The air chamber 112b is subsequently fluidly coupled to the air chamber 112c though a second set of apertures 150b and another one of the check valves 152. The conduit 162 is similarly fluidly coupled to the air chamber 112c. Finally, the air chamber 112c is fluidly coupled to the outlet 17.

Referring to the valve head 114, the air chamber 114c is fluidly coupled to the conduit 160 to receive air from the valve head 112. An outlet 117 is provided in the valve head 114 and in this instance may be coupled to a pressure sensor (not shown) to monitor the pressure of the device 10. It will be appreciated that the outlet 117 may be coupled to any device, conduit, sensor, or other suitable device as desired. The air chamber 114c is coupled to the air chamber 114b through a third set of apertures 150c including another one of the check valves 152. Next, the air chamber 114b is coupled to the air chamber 114a and the conduit 162 through a fourth set of apertures 10d including a further one of the check valves 152. As noted above, the conduit 162 is fluidly coupled to the air chamber 112c through the motor housing 11.

Figure 4:
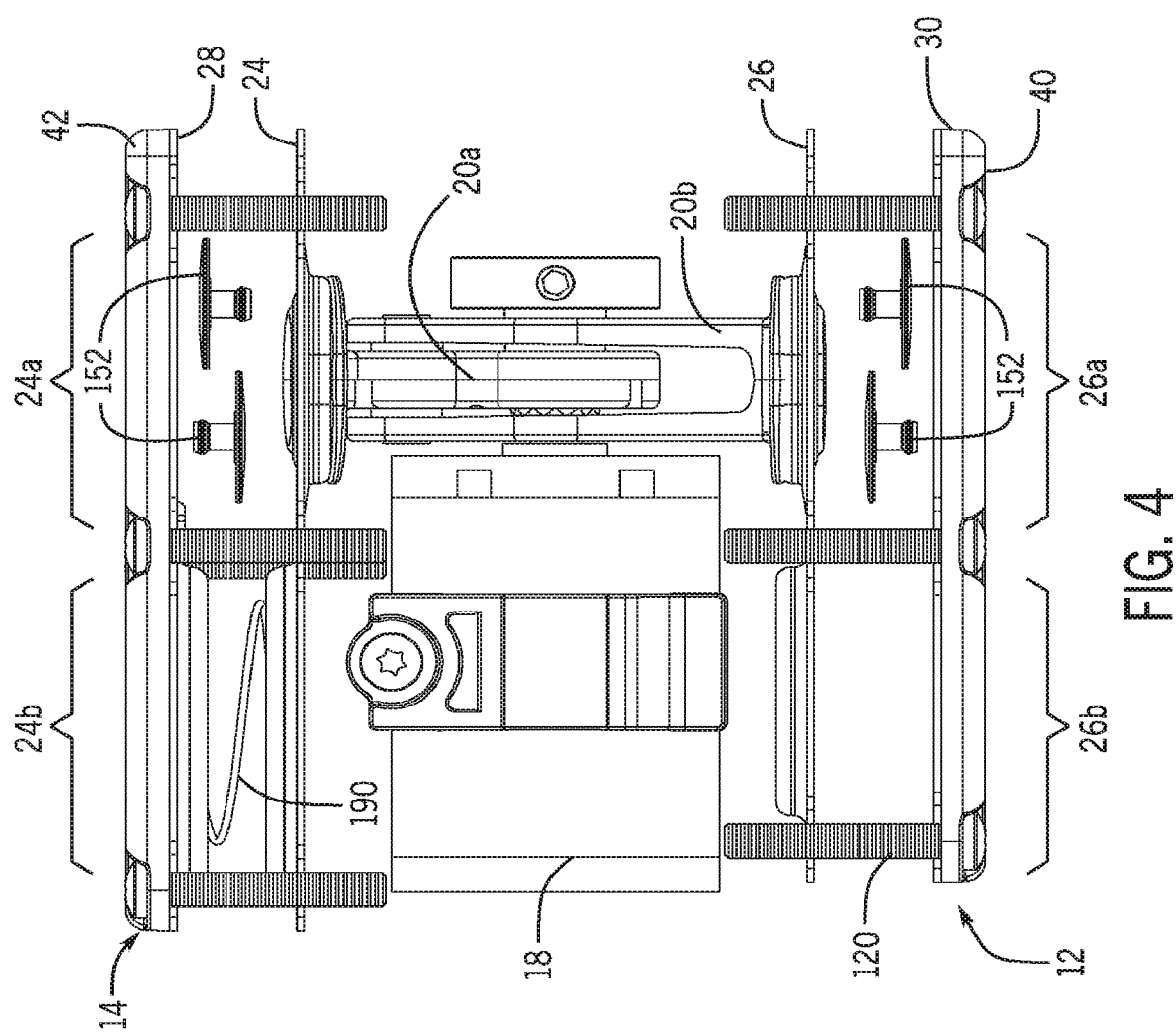
FIG. 4 is a side elevational view of the example personal air sampling pump assembly of FIG. 1 with a portion of the housing removed.
Figure 5:
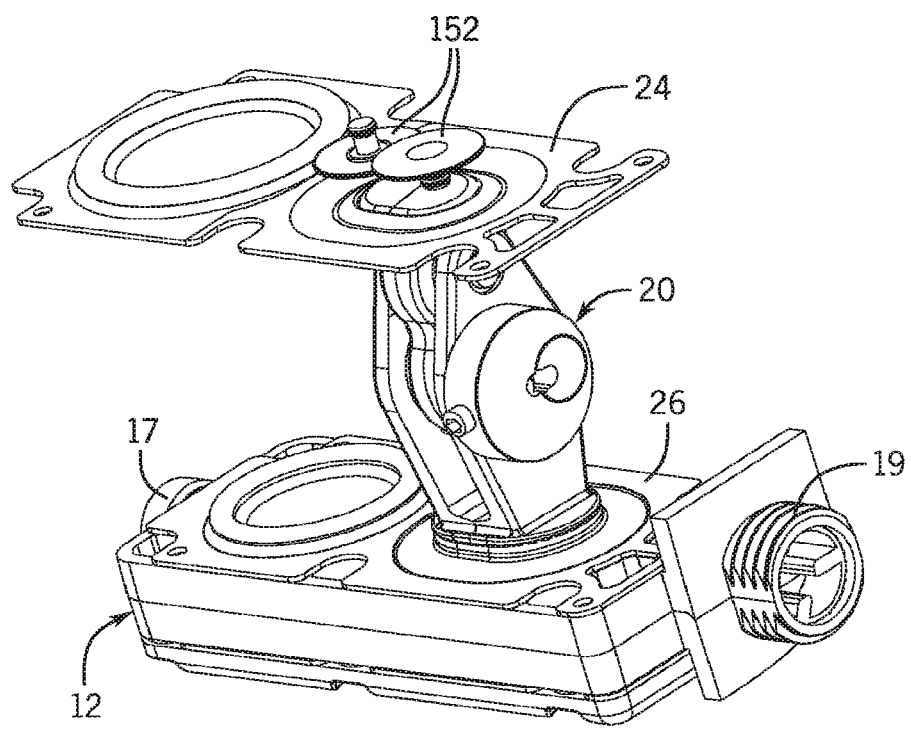
FIG. 5 is a perspective view of the example personal air sampling pump assembly of FIG. 1 with additional components removed to show additional details of the motor and piston assembly.
Figure 6:
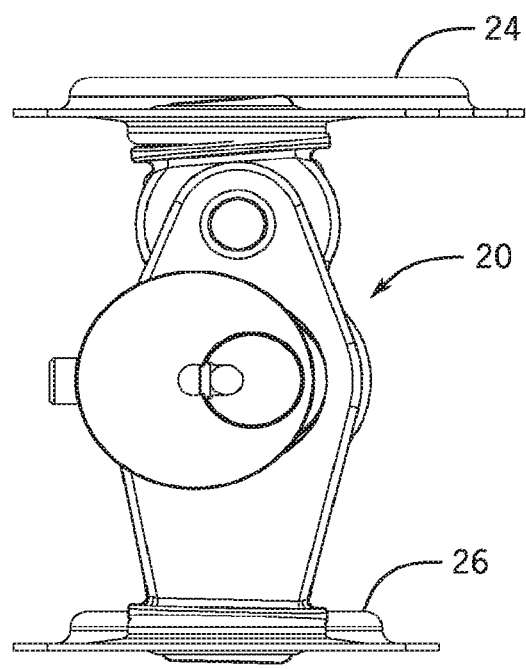
FIG. 6 is a side elevational view of the example personal air sampling pump assembly of FIG. 1 showing the motor and pistons coupled to the first elastomeric diaphragms.

As will be appreciated, each of the elastomeric membranes 24, 26, 28, 30 serves to perform multiple functions and, in this example as illustrated in FIG. 4, generally includes a piston diaphragm portion 24a, 26a, and a pulsation damper membrane portion 24b, 26b, respectively. In particular, for each assembly 14, 12, the layered construction includes multiple elastomeric diaphragms separated by a valve head as described above. Each of the first elastomeric elements is generally considered an elastomeric piston diaphragm molding. As shown in FIG. 7A, the example elastomeric element 26 provides a sealing gasket between the motor housing 11 (removed in FIG. 7A) and the valve head 112, and includes a pump diaphragm membrane 170 which is coupled to one of the pistons 20, and a flexible damper membrane 172. Meanwhile, as illustrated in FIG. 7B, the example elastomeric element 30 similarly provides a sealing gasket between the cover plate 40 (removed in FIG. 7B) and the valve head 112, and includes a flexible damper membrane 180.

Although not illustrated in FIGS. 7A and 7B, the construction of the valve head and pulsation damper assembly 14 may be similar to the construction described in relation to the illustrated valve head and pulsation damper assembly 12, or may be any suitable design. Furthermore, the layered construction of the present disclosure may be applicable to a single acting (i.e., a single piston diaphragm assembly) or a double action pump design as disclosed herein.

As illustrated, the elastomeric elements 26, 30 may include a plurality of raised line features such as the raised line future 182, on the surface of the respective elements 11, 112, 114, 40, and 42 to locally increase the compressive force applied to the membrane and to aid in sealing the entire assembly.

The pulsation damper membrane portions 24b, 26b are generally formed from the combination of the flexible elastomeric damper membranes 26, 30 and the enclosed air chamber 112c formed within the valve head 112. The combination of the elastic structure and the associated cavity volume reduces the amplitude of pulsations in the pump's inlet and outlet airflow. In addition, as shown in FIG. 4, the damper membrane portions 24b, 26b, may optionally include a spring 190, such as a coil spring, or other suitable mechanism to alter the spring characteristics of the membranes 26, 30 and the damper response. Further, the flow pulsation dampener portion 24b, 26b generally reduces the level of pulsations induced by the actions of the diaphragm. In a typical personal sampling pump, the magnitude of pulsations in the air flow velocity leads to changes in the performance characteristics of size selective sampling heads such as cyclones.

As will be appreciated by one of ordinary skill in the art, the action of the reciprocating piston 20 against the piston diaphragm portion 24a, 26a may be used to create a positive or negative air pressure pumping effect as desired. The piston diaphragm portion 24a, 26a are used to move a volume of gas or air, and the elastomeric membranes 24, 26, 28, 30 are stretched across the valve heads 112, 114 and not physically bonded thereto. In operation, the motor 20 including eccentric connecting rods create oscillatory pumping motion in the elastomeric membranes 24, 26.

Figure 11:
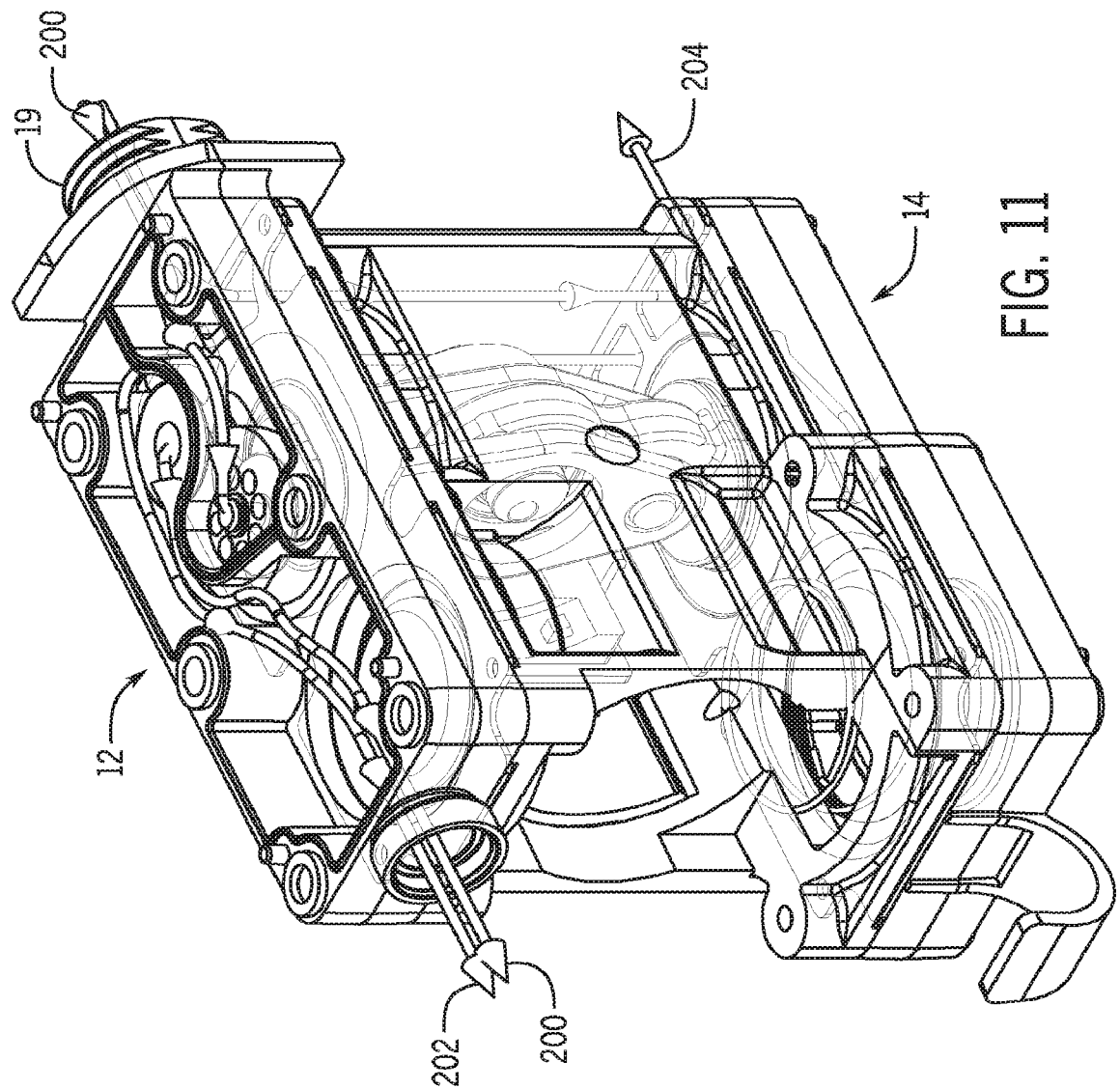
FIG. 11 is a transparent perspective view of the example personal air sampling pump assembly of FIG. 1 showing an example fluid flow path.
Figure 12:
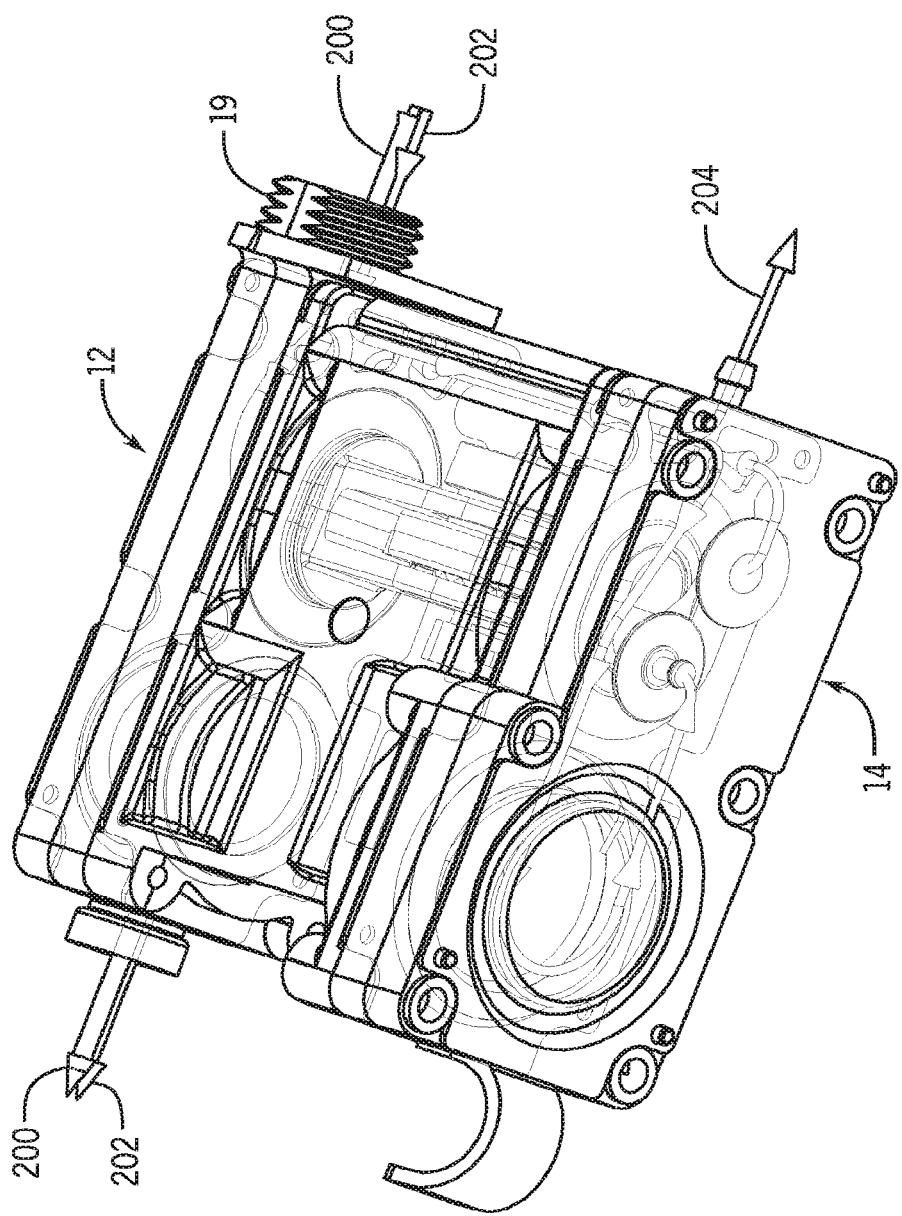
FIG. 12 is an alternative perspective view of FIG. 11 additionally showing the example fluid flow path.

The movement caused by the piston diaphragm assemblies is used to move a volume of fluid, gas, or air as illustrated in FIGS. 11 and 12. In general, air enters into the assembly 10 at the inlet 19 and flows one of two fluid paths 200, 202 as shown. In the first path 200, the air enters the inlet 19 and travels through the three air chambers 112a, 112b, 112c, under influence of air pressure caused by the operation of the piston diaphragms portions 24a, 26a, and exits the assembly 10 at the outlet 17, where it may travel through the outlet assembly 16 for flow sensing and/or other suitable processing, or through any other suitable device. At the same time, at least a portion of the air entering at the inlet 19 may travel via the second air path 202 into the conduit 160 and into the air chambers 114a, 114b, 114c. As noted above, a portion of the air 204 may be bled through the outlet 117 for any suitable purpose, including for instance, for pressure sensing. The air may then return to the valve head 112 and specifically the air chamber 112c through the conduit 162, where the air may similarly exit through the outlet 17.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

We claim:

1. An apparatus comprising:
a housing;
a fluid inlet formed in the housing;
a fluid outlet formed in the housing;
a piston within the housing;
a valve head;
a first diaphragm operably coupled to a first end of the piston, the first diaphragm at least partially enclosing a first fluid chamber, the first fluid chamber having a first fluid chamber air inlet and a first fluid chamber air outlet, wherein the first diaphragm is coupled to the valve head;
a second diaphragm operably coupled to a second end of the piston, the second diaphragm at least partially enclosing a second fluid chamber having a second fluid chamber air outlet, wherein:
while the piston moves in a first direction:
the first diaphragm is configured to cause air to move into the first fluid chamber from outside the housing via the fluid inlet, and
the second diaphragm is configured to cause air to move out of the second fluid chamber via the second fluid chamber air outlet toward the outside of the housing via the fluid outlet; and
while the piston moves in a second direction:
the first diaphragm is configured to cause air to move out of the first fluid chamber via the first fluid chamber air outlet toward the outside of the housing via the fluid outlet, and
the second diaphragm is configured to cause air to move into the second fluid chamber from the outside of the housing via the fluid inlet; and
a damper membrane portion having a damper membrane coupled to the valve head to which the first diaphragm is also coupled, the damper membrane portion at least partially enclosing a damper fluid chamber, wherein the damper fluid chamber is fluidly connected to both of the first fluid chamber air outlet and the second fluid chamber air outlet, wherein air that moves out of both of the first fluid chamber and the second fluid chamber moves into the damper fluid chamber.

2. The apparatus of claim 1, further comprising a first diaphragm assembly comprising the first diaphragm and the valve head, wherein the valve head defines the first fluid chamber and comprising at least one check valve at the first fluid chamber inlet or the first fluid chamber outlet.

3. The apparatus of claim 2, wherein the first diaphragm sealingly engages the valve head.

4. The apparatus of claim 1, wherein the valve head is a first valve head, wherein the damper membrane is a first damper membrane, wherein the damper fluid chamber is a first damper fluid chamber, wherein the damper membrane portion is a first damper membrane portion, wherein the apparatus further comprises a second damper membrane portion at least partially enclosing a second damper fluid chamber, the second damper membrane portion comprising a second damper membrane connected to a second valve head, wherein the second diaphragm is also connected to the second valve head.

5. The apparatus of claim 1, wherein the damper membrane portion is configured to move corresponding to movement of the first diaphragm based on a change in air pressure in the first fluid chamber.

6. The apparatus of claim 1, wherein the damper membrane portion decreases vibration of the apparatus.

7. The apparatus of claim 1, wherein the damper membrane portion reduces the amplitude of pulsation in airflow at the fluid inlet and the fluid outlet.

8. The apparatus of claim 1, wherein air is configured to move toward a filter medium as the piston moves in both the first direction and the second direction.

9. The apparatus of claim 1, further comprising a motor mounted to the piston configured to reciprocally drive the piston.

10. The apparatus of claim 1, wherein the fluid inlet and the fluid outlet are integrally formed within the housing.

11. The apparatus of claim 1, wherein the fluid outlet is a first fluid outlet, and wherein the air sampling pump further comprises a second fluid outlet configured to bleed air out at least one of the first fluid chamber or the second fluid chamber.

12. The apparatus of claim 11, wherein the second fluid outlet is coupled to a pressure sensor configured to monitor the pressure within at least one of the first fluid chamber or the second fluid chamber.

13. The apparatus of claim 1, wherein the apparatus is configured to draw air, and not liquid, into the housing via the fluid inlet.

14. The apparatus of claim 13, wherein the apparatus is further configured to draw the air toward a filter medium such that particulate material in the air may be collected on the filter medium.

15. The apparatus of claim 1, wherein the valve head to which the damper membrane and the first diaphragm are both coupled comprises a single, integral component.

16. The apparatus of claim 1, wherein the damper membrane and the first diaphragm are each directly coupled to the valve head.

17. An apparatus comprising:
a housing;
a fluid inlet formed in the housing;
a fluid outlet formed in the housing;
a piston within the housing;
a valve head;
a first diaphragm operably coupled to a first end of the piston, the first diaphragm at least partially enclosing a first fluid chamber, the first fluid chamber having a first fluid chamber air outlet, wherein the first diaphragm is coupled to the valve head; and
a second diaphragm operably coupled to a second end of the piston, the second diaphragm at least partially enclosing a second fluid chamber having a second fluid chamber air outlet, wherein:
while the piston moves in a first direction:
the first diaphragm is configured to cause air to move into the first fluid chamber through a first check valve at a first aperture in the first fluid chamber, and
the second diaphragm is configured to cause air to move out of the second fluid chamber via the second fluid chamber air outlet through a second check valve at a first aperture in the second fluid chamber; and
while the piston moves in a second direction:
the first diaphragm is configured to cause air to move out of the first fluid chamber via the first fluid chamber air outlet through a third check valve at a second aperture in the first fluid chamber, and
the second diaphragm is configured to cause air to move into the second fluid chamber through a fourth check valve at a second aperture in the second fluid chamber; and
a damper membrane portion having a damper membrane coupled to the valve head to which the first diaphragm is also coupled, the damper membrane portion at least partially enclosing a damper fluid chamber, wherein air that moves out of both of the first fluid chamber and the second fluid chamber moves through the third check valve into the damper fluid chamber.

18. The apparatus of claim 17, wherein the housing forms a third fluid chamber fluidly connected to the fluid inlet and a fourth fluid chamber fluidly connected to the fluid outlet.

19. The apparatus of claim 18, wherein the first aperture in the first fluid chamber and the second aperture in the second fluid chamber fluidly connect the third fluid chamber to both the first fluid chamber and the second fluid chamber.

20. The apparatus of claim 19, wherein the second aperture in the first fluid chamber and the first aperture in the second fluid chamber fluidly connect the fourth fluid chamber to both the first fluid chamber and the second fluid chamber.

21. An apparatus comprising:
a housing having an air inlet and an air outlet;
a piston;
a valve head;
a first diaphragm connected to a first end of the piston, the first diaphragm at least partially enclosing a first fluid chamber, the first fluid chamber having a first fluid chamber air outlet, wherein the first diaphragm is coupled to the valve head; and
a second diaphragm connected to a second end of the piston, the second diaphragm at least partially enclosing a second fluid chamber having a second fluid chamber air outlet, wherein:
while the piston moves in a first direction:
the first diaphragm is configured to cause air to move into the first fluid chamber, and
the second diaphragm is configured to cause air to move out of the second fluid chamber via the second fluid chamber air outlet; and
while the piston moves in a second direction:
the first diaphragm is configured to cause air to move out of the first fluid chamber via the first fluid chamber air outlet, and
the second diaphragm is configured to cause air to move into the second fluid chamber; and
a damper membrane portion having a damper membrane coupled to the valve head to which the first diaphragm is also coupled, the damper membrane portion at least partially enclosing a damper fluid chamber, wherein the damper fluid chamber is fluidly connected to both of the first fluid chamber air outlet and the second fluid chamber air outlet, wherein air that moves out of both of the first fluid chamber and the second fluid chamber air outlet moves into the damper fluid chamber.

22. An apparatus comprising:
a housing;
a fluid inlet formed in the housing;
a fluid outlet formed in the housing;
a piston within the housing;
a valve head;
a first diaphragm operably coupled to a first end of the piston, the first diaphragm at least partially enclosing a first fluid chamber, wherein the first diaphragm is coupled to the valve head; and
a second diaphragm operably coupled to a second end of the piston, the second diaphragm at least partially enclosing a second fluid chamber, wherein:
while the piston moves in a first direction:
the first diaphragm is configured to cause air to move into the first fluid chamber through a first check valve at a first aperture in the first fluid chamber, and
the second diaphragm is configured to cause air to move out of the second fluid chamber through a second check valve at a first aperture in the second fluid chamber; and while the piston moves in a second direction:
  the first diaphragm is configured to cause air to move out of the first fluid chamber through a third check valve at a second aperture in the first fluid chamber, and
  the second diaphragm is configured to cause air to move into the second fluid chamber through a fourth check valve at a second aperture in the second fluid chamber; and
a damper membrane portion having a damper membrane coupled to the valve head to which the first diaphragm is also coupled, the damper membrane portion at least partially enclosing a damper fluid chamber, wherein air that moves out of the first fluid chamber moves through the third check valve into the damper fluid chamber,
wherein the housing forms a third fluid chamber fluidly connected to the fluid inlet and a fourth fluid chamber fluidly connected to the fluid outlet, and
wherein the first aperture in the first fluid chamber and the second aperture in the second fluid chamber fluidly connect the third fluid chamber to both the first fluid chamber and the second fluid chamber.

23. The apparatus of claim 22, wherein the second aperture in the first fluid chamber and the first aperture in the second fluid chamber fluidly connect the fourth fluid chamber to both the first fluid chamber and the second fluid chamber.

* * * * *